United States Patent [19]

Kataoka

[11] 4,140,672
[45] Feb. 20, 1979

[54] PROCESS FOR PRODUCING MOLDINGS
[75] Inventor: Hiroshi Kataoka, Tokyo, Japan
[73] Assignee: Asahi-Dow Limited, Tokyo, Japan
[21] Appl. No.: 867,185
[22] Filed: Jan. 4, 1978
[30] Foreign Application Priority Data
  Jan. 5, 1977 [JP] Japan .................................. 52-316
[51] Int. Cl.² ............................................. B29D 27/00
[52] U.S. Cl. .................................... 264/45.1; 264/51;
        264/523; 264/328; 264/DIG. 83; 425/817 R
[58] Field of Search .................. 264/DIG. 83, 51, 53,
              264/54, 45.1, 93, 94, 88, 328; 425/817 R

[56]         References Cited
        U.S. PATENT DOCUMENTS

| 2,209,877 | 7/1940 | Ferngren ........................... 264/94 X |
| 2,872,760 | 2/1959 | Meissner ............................ 264/88 X |
| 2,996,764 | 8/1961 | Ross et al. ....................... 264/328 X |
| 3,378,612 | 4/1968 | Dietz ............................ 264/DIG. 83 |
| 3,751,534 | 8/1973 | Oxley ........................... 264/DIG. 83 |
| 3,801,684 | 4/1974 | Schrewe et al. ............. 264/DIG. 83 |
| 3,966,372 | 6/1976 | Yasuike et al. ................. 264/45.1 X |
| 4,033,710 | 7/1977 | Hanning ...................... 425/817 R X |

FOREIGN PATENT DOCUMENTS

| 1929343 | 12/1970 | Fed. Rep. of Germany ... 264/DIG. 83 |
| 2106546 | 8/1972 | Fed. Rep. of Germany ... 264/DIG. 83 |
| 2461580 | 7/1975 | Fed. Rep. of Germany ... 264/DIG. 83 |
| 1305224 | 1/1973 | United Kingdom ............ 264/DIG. 83 |

OTHER PUBLICATIONS

Margerison D. and G. C. East, "An Introduction to Polymer Chemistry," New York, Pergamon Press, c 1967, p. 1.
"The Condensed Chemical Dictionary," Eighth Edition, Revised by Gessner G. Hanley, New York, Van Nostrand Reinhold, c 1971, p. 644.

Primary Examiner—Philip Anderson
Attorney, Agent, or Firm—Cushman, Darby & Cushman

[57] ABSTRACT

A process for producing moldings comprises the steps of injecting a plastified synthetic resin into a mold cavity, thereafter or simultaneously injecting heated fluid having a viscosity of 0.01 - 100 poise into the same mold cavity to fill it with said fluid in such a manner that said heated fluid is surrounded by said synthetic resin within said mold cavity and releasing said fluid from said mold cavity after at least a portion of said synthetic resin has set. If the injected synthetic resin contains any foaming agent, a foamed article having its outer smooth skin can be obtained according to the present invention. If the injected synthetic resin contains no foaming agent, a hollow, smooth-surfaced article can be obtained.

11 Claims, 30 Drawing Figures

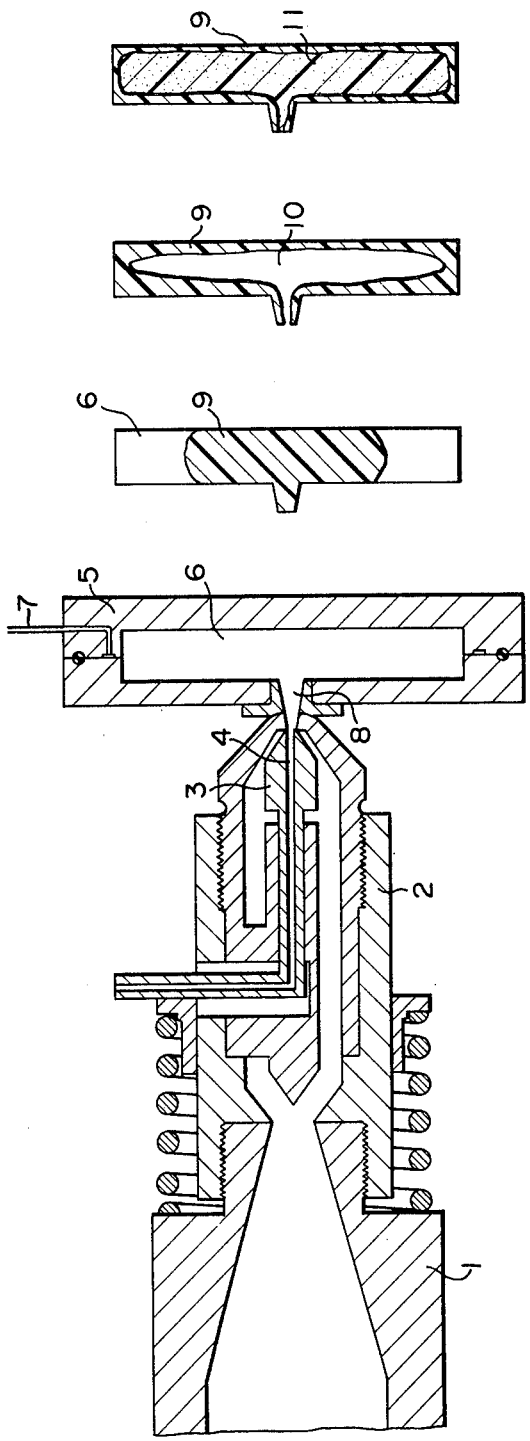

FIG. 2-1 　　FIG. 2-2 　　FIG. 2-3
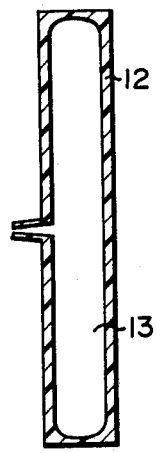
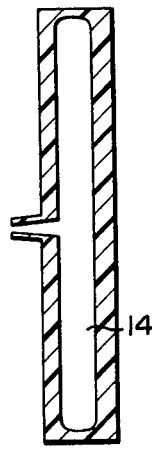
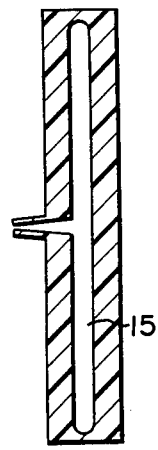
FIG. 3-1 　　FIG. 3-2 　　FIG. 3-3
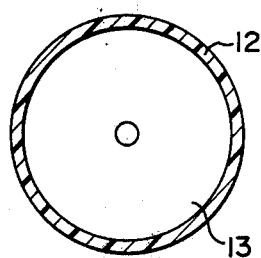
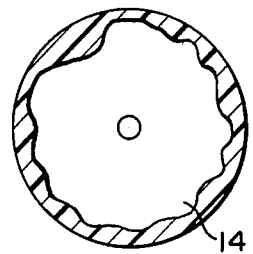
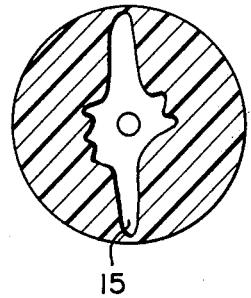

F I G. 14-3
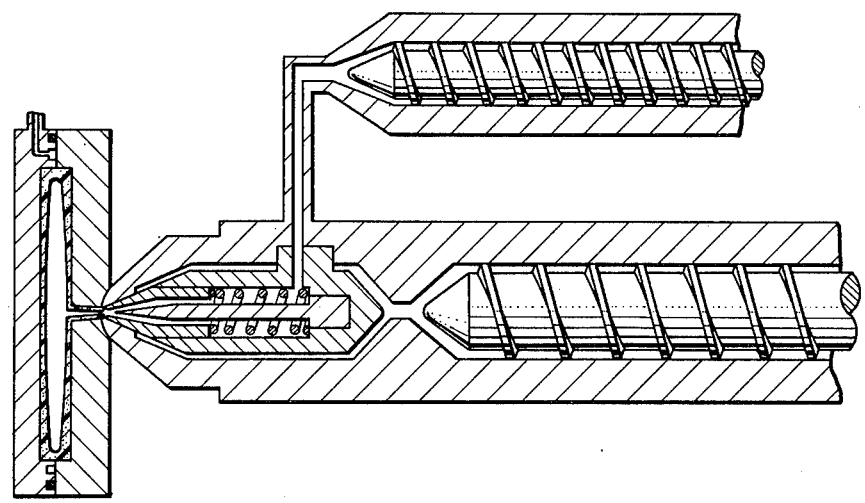
F I G. 14-4
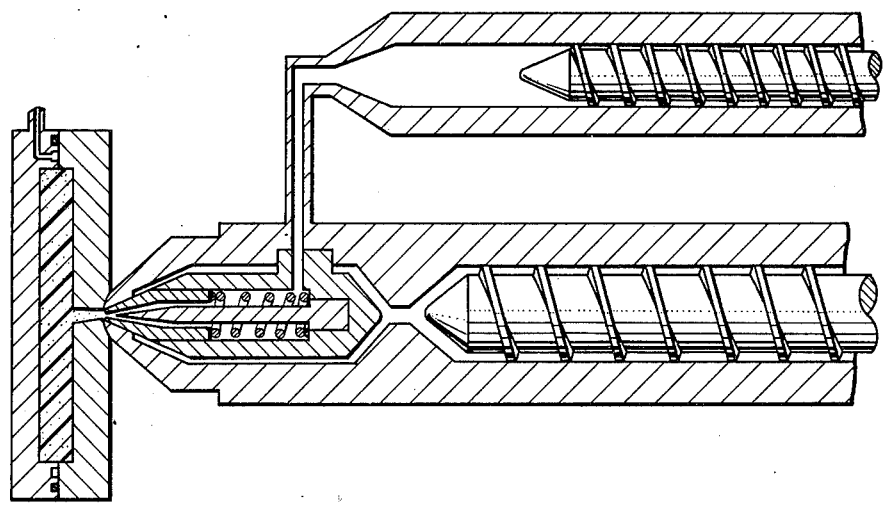

PROCESS FOR PRODUCING MOLDINGS

The present invention relates to a process for injection molding foamed or hollow articles having smooth skins.

It is known to produce a hollow article having a hollowed portion filled with some fluid by using the steps of injecting a plastified synthetic resin into a mold cavity and thereafter injecting the fluid into the mold cavity to form the hollowed portion of the synthetic resin. It is also known to produce a foamed article by using the steps of injecting plastified synthetic resin having some foaming agent into a mold cavity, injecting similarly some fluid thereinto to form a hollowed portion in said synthetic resin within the mold cavity and thereafter releasing the fluid from the mold cavity. We had proposed such a process using gaseous fluid by U.S. Ser. No. 534,134 filed on Dec. 18, 1974 and now abandoned in favor of continuation application 814,127 filed July 8, 1977. Also, we had filed a patent application relating to such a process using liquid such as water under DT-OS 2461580. Moreover, such a process using synthetic resin as fluid is known in the art by Japanese Patent Disclosure No. 135174/75 which is based on Japanese Patent application No. 42396/1974.

Studying gaseous fluid, liquid such as water and synthetic resin all of which are used as fluid in the process of the above type, we have found various disadvantages thereof. One of such disadvantages is that hollow or foamed articles are unsatisfactorily molded unless the plastified synthetic resin as well as the fluid for forming the hollowed portion in the plastified synthetic resin have proper viscosities.

It is an object of the present invention to provide a process for injection molding hollow or foamed articles having smooth skins.

Another object of the present invention is to provide a process for injection molding hollow or foamed articles having specific gravity lower than that in the prior art.

Still another object is to provide a process for injection molding hollow articles of a sandwich structure with its smooth skin.

The present invention provides an injection molding process comprising the steps of injecting plastified synthetic resin into a mold cavity, thereafter or simultaneously injecting heated fluid into the same mold cavity to fill it with said fluid in such a manner that said heated fluid is surrounded by said synthetic resin within said mold cavity and releasing said fluid from said mold cavity after at least a portion of said synthetic resin has set, characterized by the fact that said heated fluid is viscous liquid which is in the form of grease or solid under the ordinary room temperature while having a viscosity of 0.01-100 poise under the raised working temperature thereof.

The present invention also provides a process for producing satisfactory foamed articles having smooth surfaces from synthetic resin containing a foaming agent.

FIGS. 1—1 through 1-4 illustrate various steps for molding a foamed article in accordance with the process of the present invention;

FIGS. 2-1 through 2-3 illustrate, in vertical cross-section, composite bodies molded by using three sorts of viscous liquid having different viscosities;

FIGS. 3-1 through 3—3 illustrates, in horizontal cross-section, three different disk-shaped products molded by using the viscous liquid similar to that in FIGS. 2-1 through 2-3;

FIGS. 13-1 through 13-4 illustrate, in cross-section, various steps for molding a sandwich article from two sorts of synthetic resins;

FIGS. 14-1 through 14-4 illustrate, in cross-section, an injection molding machine used in the process of the present invention in its different steps; and FIGS. 15-1 through 15-4 illustrates various molding steps in accordance with a modified process of the present invention.

There will be described, in connection with the accompanying drawings, various problems involved by using respectively gaseous fluid, liquid such as water, and synthetic resin as fluid for forming a hollowed portion in the process of the aforementioned type, and various improvements according to the present invention in which a fluid is used having its viscosity in such a range as defined in the present invention.

Figures 1, 2, 3, 4, 13:
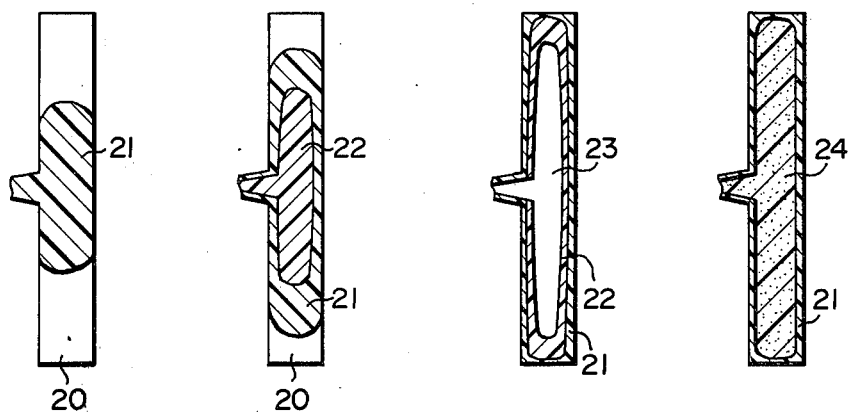

Referring to FIG. 1, plastified synthetic resin containing foaming agent is first of all accumulated in an injection cylinder 1 and thereafter injected into a mold cavity 6 through a needle-type nozzle 2 which is mounted on the extremity of the injection cylinder 1. The nozzle 2 can be opened in response to the injection pressure of the resin within the cylinder 1. The needle-typed nozzle 2 is provided with a needle 3 through which a duct 4 for injecting viscous liquid into the mold cavity is provided longitudinally.

The mold cavity 6 is defined by metal mold 5 and is charged with a gas under pressure through a duct 7 prior to the injection of synthetic resin (FIG. 1—1).

When an injection screw (not shown) in the cylinder 1 is forwardly moved, the synthetic resin therewithin causes the needle 3 to move backwardly so that the synthetic resin will be injected into the mold cavity 6 to position around a gate 8 as a mass (FIG. 1-2). Subsequently, a viscous liquid is injected into the mold cavity 6 towards the mass of the synthetic resin therein through the duct 4 of the needle 3 to temporarily form a composite structure which consists of a surface layer of the synthetic resin 9 with foaming agent and a core of the viscous liquid 10 (FIG. 1-3). When the surface layer is partially set, the viscous liquid 10 forming the core is released from the mold cavity through the gate 8 so that the synthetic resin forming the surface layer will be expanded inwardly within the mold cavity to form an article consisting of a foamed core 11 and the smooth surface layer 9 with its smooth skin (FIG. 1-4).

If the synthetic resin injected into the mold cavity contains no foaming agent, a hollow article would be obtained in such a form as shown in FIG. 1-3. It is noted that, in accordance with the present invention, the foamed article as shown in FIG. 1-4 and the hollow article as shown in FIG. 1-3 can be injection molded.

When the plastified synthetic resin is injected into the mold cavity defined by the cold mold and subsequently the fluid is injected into the mold cavity toward the synthetic resin therein, the ratio of volume between the surface layer and the core is varied in accordance with the viscosities of the fluid injected into the mold cavity to penetrate into the synthetic resin therein. In general, the viscosity of the fluid is higher, as the volume of core becomes larger. If the fluid is the same in viscosity as the synthetic resin previously injected into the cavity, a good article will be obtained with its core having sufficiently large volume. On the other hand, if the viscosity of the fluid is higher, the fluid will hardly be discharged from the mold cavity so that it becomes difficult to make any hollow or foamed article.

Studying various fluid for forming the core, we have attained the present invention. It has been found that extremely satisfactory results will be obtained if the viscous liquid for forming the core has a viscosity of 0.01-100 poise under the raised working temperature thereof.

Different viscosities of the viscous liquid used in the process of the present invention will now be described in connection with FIGS. 2 and 3. FIG. 2 illustrates in cross-section various composite products which are molded by using three sorts of viscous liquids having their different viscosities. FIG. 3 illustrates in horizontal cross-section three different disk-like composite products in the same manner as in FIG. 2.

In FIGS. 2-1 and 3-1, a synthetic resin which is normally used for injection molding is utilized as the viscous liquid for forming the core. Such synthetic resin has generally its viscosity of above 1000 poise. Therefore, when such synthetic resin is used for forming the core, a surface layer 12 is formed uniformly thinner while a core 13 is formed thicker. See FIGS. 2-1 and 3-1. However, if the conventional synthetic resin is used for forming a core, it is difficult to produce a hollow or foamed article, since the resultant core is hardly discharged from the mold cavity. The core fluid having a viscosity of above 100 poise is generally difficult to be withdrawn from the mold cavity through the gate. It is only possible to mold a hollow or foamed product when a mold has its extremely thick cavity and large gate formed therein.

FIGS. 2-3 and 3—3 show respectively products molded where liquid or gas of below 0.01 poise is used for forming a core. Such a liquid or gas is difficult to form a core having its uniform dimensions resulting in the formation of thicker surface layer and thinner core 15. In such a case, the core can easily be discharged from the mold cavity, but cannot substantially be formed with its uniform configuration having larger thickness resulting in a hollow or foamed article which has a large specific gravity.

When any fluid is used having its viscosity lower than that defined in the present invention, there is a problem in safety in addition to the aforementioned disadvantages. For example, the use of gas or water under high pressure and/or temperature is severely constrained under the Japanese disciplinary rules for safety. Any little leakage of such low viscous fluid under high pressure and temperature from a molding machine may expose an operator to a danger such as scald or the like. From the viewpoint of safety, it is preferred to use a viscous fluid for forming a core which has its higher viscosity.

The fluid for forming a core is frequently confined within moldings. This is very dangerous in that the pressurized gas or the pressurized and heated water may be accidentally spouted from such moldings during handling.

It has been also found that the lower the viscosity of fluid is, the more the fluid leaks from a molding device. In general, the leakage is inversely proportional to the viscosity of fluid. When a fluid having a viscosity of below 0.01 poise is desired to utilize for forming a core, it is necessary to provide soft packings in a molding machine for preventing the fluid from leaking. However, such soft packings have poor heat resistance so that the molding machine itself will be poorly durable.

FIGS. 2—2 and 3-2 show products formed with their cores 14 by using viscous liquid defined in the present invention which has its viscosity of 0.01-100 poise. Such viscous liquid provides cores having a thickness larger than by liquid or gas of below 0.01 poise and also cores having a thickness smaller than by the conventional synthetic resin to be injection molded. The viscous fluid in the range of 0.01-100 poise can easily be released from a mold cavity through a gate by using any suitable means such as withdrawing or the like so that any hollow or foamed article may easily be produced. It is preferred to use viscous liquid of lower viscosity in the range of 0.01-100 poise when a mold cavity is relatively small in thickness. When a mold cavity is relatively large in thickness, it is preferred to use viscous liquid of higher viscosity in the above range. This is because the viscous liquid is readily released from the mold cavity while maintaining the thickness of the core substantially constant. In such a manner, the present invention provides, for the first time, hollow or foamed moldings having low specific gravity.

The viscosity of fluid as well as the releasing of fluid from the mold cavity will now be described in more detail.

In general, pressure loss in any fluid moving between two parallel plates can be represented by the following formula.

$$\Delta P = \beta \times (l\eta Q/H^3)$$

where $\Delta P$ is a pressure loss; $\eta$ is a viscosity; $Q$ is flow rate; $H$ is a distance between the plates; $\beta$ is a constant; and $l$ is a travelling distance of the fluid. Namely, the pressure loss is proportional to the viscosity. The viscous liquid can easily be released from the mold cavity by using the liquid of lower viscosity and the parallel plates spaced away from each other by larger distance, that is, the mold cavity having a larger thickness. As the thickness of the mold cavity is determined, the viscosity is effectively decreased.

Figure 4:
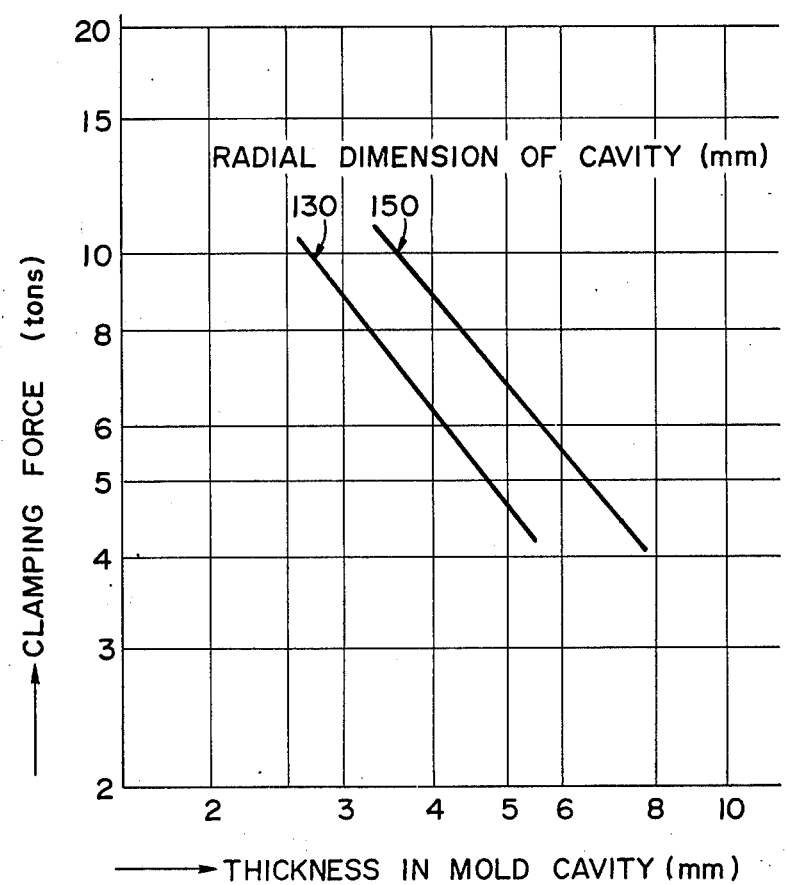
FIG. 4 is a graph showing a relationship between thickness and clamping force in two mold cavities having different radii.
Figure 5:
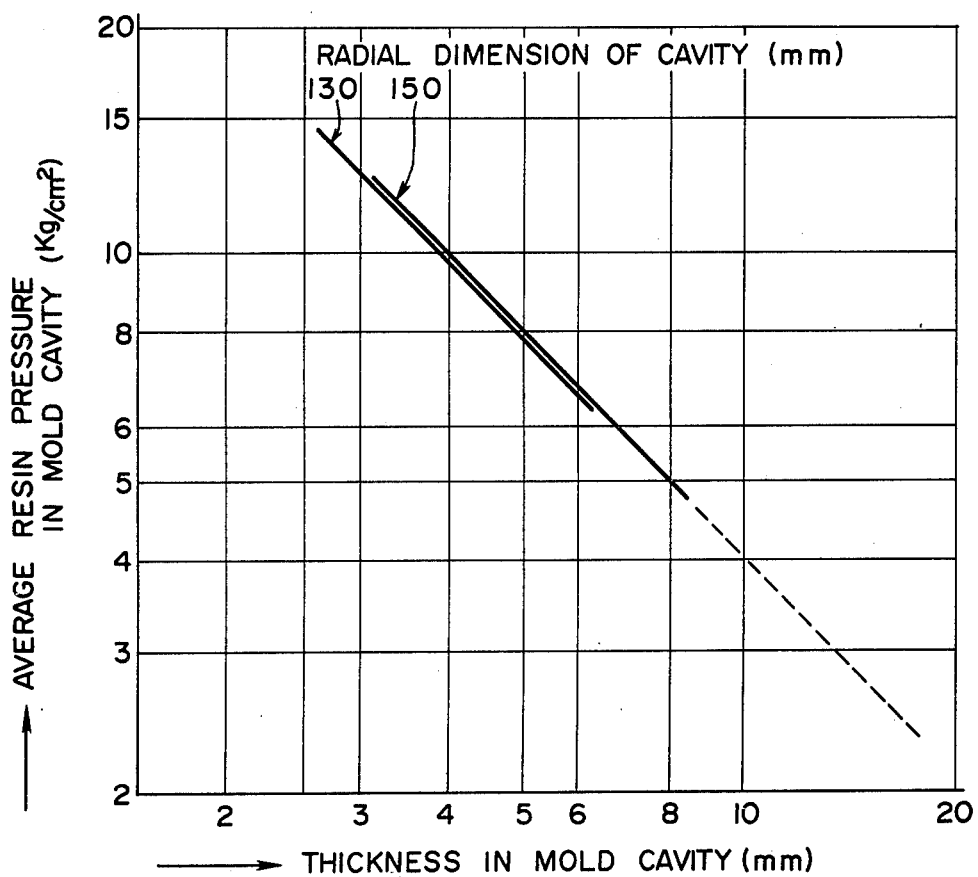
FIG. 5 is a graph showing a relationship between thickness and average resin pressure in the same mold cavities as in FIG. 4.

We have measured such pressure that is required to move the synthetic resin within the mold cavity. The results are shown in FIGS. 4 and 5. It has been found that the conventional synthetic resin requires a substantial pressure to move within the mold cavity.

FIG. 4 shows various clamping forces measured when polystyrene (sold by ASAHI-DOW LTD. under the name of Styron 666) is injected at 220° C. into two sorts of mold cavities having different radii of 130 and 150 mm which can be changed in thickness. Increasing the thickness in the mold cavities, the necessary clamping force is rapidly decreased.

FIG. 5 shows a graph plotting average resin pressure on the mold cavity with respect to the necessary clamping force. It has been found from FIG. 5 that the resin pressure required to move the polystyrene within the mold cavity depends on the thickness thereof. In order to move the polystyrene within the mold cavity under low pressure, for example, below 2 kg/cm$^2$, the mold cavity must have its thickness of above 20 mm. It is apparent from the results shown in FIGS. 4 and 5 that the synthetic resin can be applied only to mold cavities having extremely large thickness.

Figure 6:
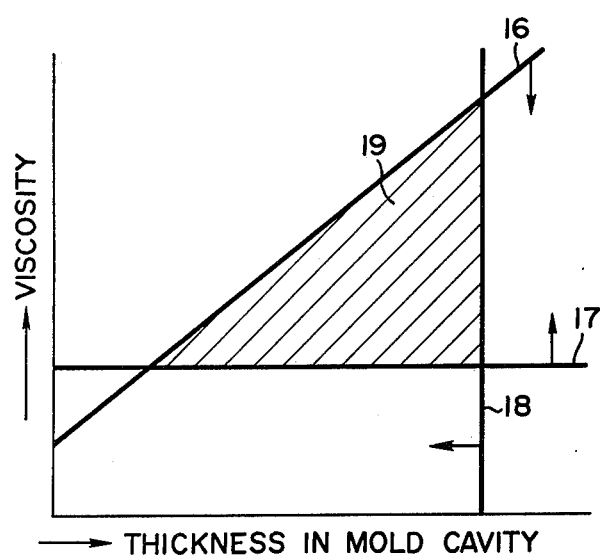
FIG. 6 is a graph showing a relationship between viscosity of the fluid used and thickness of the mold cavity.

FIG. 6 shows a relationship between the viscosity of liquid and the thickness of mold cavity. It is found in FIG. 6 that a line 16 bounds the viscosities in releasable viscous liquids from that in non-releasable viscous liquids. The viscous liquid having its viscosity plotted below the line 16 can be released from the mold cavity. A line 17 is a boundary in which a core can be steadily formed with the desired thickness thereof. It is preferred to use viscous liquid having a viscosity as shown in FIG. 6 above the line 17. A line 18 indicates a boundary in which an injection molding operation can be stably effected. Using a mold cavity having its thickness as shown above the line 18, the resultant product will have some failure mark peculiar to the thick-walled article such as jetting mark. An area 19 surrounded by the lines 16, 17 and 18 indicates the preferred viscosities suitable to use in the process according to the present invention.

The viscous liquid which has a viscosity of 0.01–100 poise at the raised working temperature is in the form of grease or solid at the ordinary room temperature. It includes some low molecular weight polymers, for example. The viscosity of the polymer is increasingly changed by increasing its degree of polymerization. A relationship between the viscosity and the polymerization degree depends on the characteristics of that polymer.

There are generally many formulae with respect to the relationship between the molecular weight and viscosity of polymer. In the area of lower molecular weight there is the following formula:

$$\log \eta = a \log Mw + K(T), \text{ and}$$

$$1 < a < 1.8$$

where K(T) is a constant which is determined by the property and temperature of the polymer used, Mw is a weight-average molecular weight and $\eta$ is a viscosity.

However, if the polymer has its molecular weight beyond certain value, the viscosity $\eta$ is rapidly increased in proportion to the 3.4th power of the molecular weight Mw as shown by the following formula (Flory-Fox's rule of 3.4th power):

$$\log \eta = 3.4 \log Mw + K(T).$$

This boundary is called as "critical molecular weight" and has been explained as the viscosity will be rapidly increased because long molecules are intertwined with one another in the molecular weight of above said certain value. The critical molecular weight is in the range of from about 10,000 to about 40,000 for weight-average molecular weight.

Polymers having their molecular weight higher than the critical molecular weight are generally utilized as synthetic resin, synthetic fiber or the like. Polymers having their molecular weight lower than the critical molecular weight are called oligomers and are not generally ued as the synthetic resin. Polymers having the physical and chemical properties of a synthetic resin have their molecular weights higher than the critical molecular weight.

The present invention intends to utilize, as viscous liquid, low-molecular-weight polymers generally called oligomers which have their molecular weight lower than the critical molecular weight. The present invention also tends to utilize, as viscous liquids, polymers with their molecular weight higher than the critical molecular weight, which are of excessive low softening point or cannot be injection molded with less molecules intertwined with one another. Such polymers include atactic polypropylenes, for example. A mixture consisted of atactic polypropylene and low molecular weight isotactic polypropylene is preferably used in accordance with the present invention.

Polymers which have their viscosities of 0.01–100 poise under molten condition are shown in the following table:

| Polymer | Temperature | Weight-average molecular weight |
|---|---|---|
| Polystyrene | 217° C. | 300 – 25,00 |
| Polyethylene | 190° C. | 700 – 15,000 |
| Polyisobutylene | 217° C. | 450 – 45,000 |

The present invention intends to utilize viscous liquid having a viscosity of 0.01–100 poise, preferably 0.1–100 poise at raised working temperature. The viscosity of such viscous liquid will be decreased according to the increase of temperature. Therefore, viscous liquid must be properly selected depending on molding temperatures and shaped articles. It is preferred to use viscous liquid having good heat stability, such as low-molecular-weight polyolefin including polyethylene, polypropylene and the like. The preferred polyethylene having a viscosity of 0.01 poise indicates respectively the weight-average molecular weights of 400, 800 and 1,500 at the respective temperatures of 130° C., 200° C. and 300° C. Polyethylenes of 10 poise and 100 poise indicate respectively weight-average molecular weights of 8,000 and 30,000 at the temperature of 220° C. It is to be noted that these weight-average molecular weights will of course change depending on the molecular-weight distributions of the polyethylenes and are indicated as rough levels. Polymers intended to utilize in the present invention include also low-molecular weight polystyrene, polyethylene glycol, polymethyl methacrylate, atactic polypropylene, isotactic polypropylene, polypropylene glycol and the like.

It is further preferred that the viscous liquid effectively used in the present invention cannot be rapidly changed in viscosity by varying the temperature thereof. The viscous liquid is preferred to have a viscosity of 0.01–100 poise at the temperature of about 200° C. which is generally used in an injection molding. Furthermore, it is preferred that such viscous liquid has higher heat stability, boiling point and flash point and less water absorption properties, which is difficult to be oxidated. The viscous liquid preferable has a boiling point of above 300° C. Oligomer is preferably utilized in the present invention since it has the viscosity changed less by varying the temperature, and higher boiling and flash points. According to the present invention, any mixture consisting of two or more sorts of polymers may be used as the viscous liquid to regulate suitably its viscosity. Moreover, the viscous liquid may include any dispersed gas such as nitrogen gas, carbon dioxide gas or the like. In such a case, the viscous liquid can easily be released from a mold cavity by expanding such a gas so that hollow or foamed articles may readily be molded.

Figure 7:
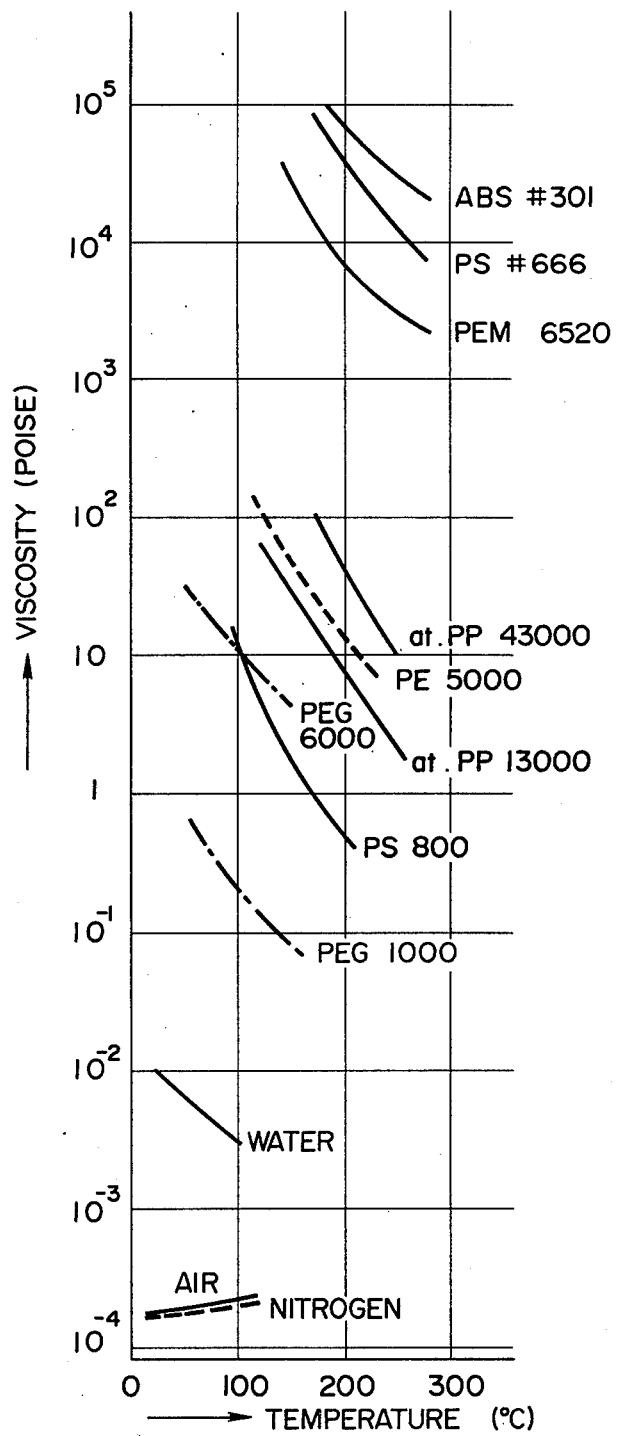
FIG. 7 is a graph showing the viscosities of different fluids under various temperatures.

FIG. 7 shows a relationship between the viscosity and temperature in various fluids. In FIG. 7, synthetic resins which can be normally injection molded are indicated by the names of ABS #301 (ABS resin #301 sold by ASAHI-DOW LIMITED), PS #666 (polystyrene resin #666 by ASAHI-DOW LIMITED), and PE M6520 (polyethylene resin M6520 by ASAHI-DOW LIMITED). Such synthetic resins are of $10^3$ poise or above. Oligomers which can be effectively used in the present invention are indicated by the symbols of at. PP 43,000 (atactic polypropylene having weight-average molecular weight of 43,000), at. PP 13,000 (atactic polypropylene having weight-average molecular weight of 13,000), PE 5,000 (polyethylene having number-average molecular weight of 5,000), PEG 6,000 (polyethylene glycol having number-average molecular weight of 6,000), PEG 1,000 (polyethylene glycol having number-average molecular weight of 1,000) and PS 800 (polystyrene having number-average molecular weight of 800). FIG. 7 also shows viscosities of water, nitrogen, and air.

Figure 8:
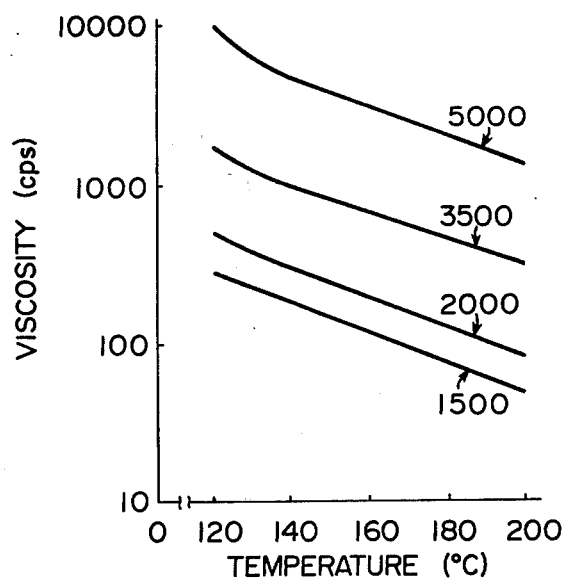
FIGS. 8 through 12 are graphs showing various temperatures to viscosities in different low-molecular-weight polymers which can be satisfactorily utilized under the viscosity of 0.01-100 poise.
Figure 9:
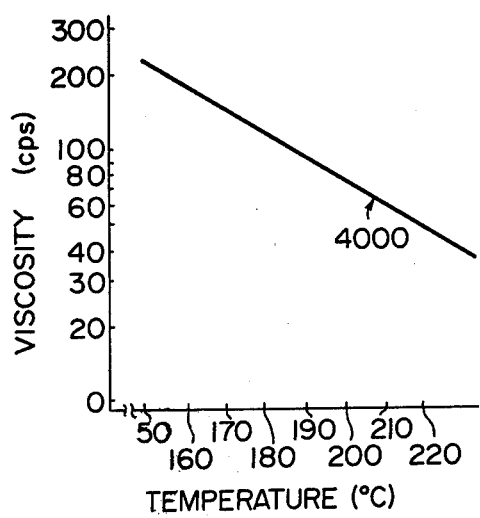
Figure 10:
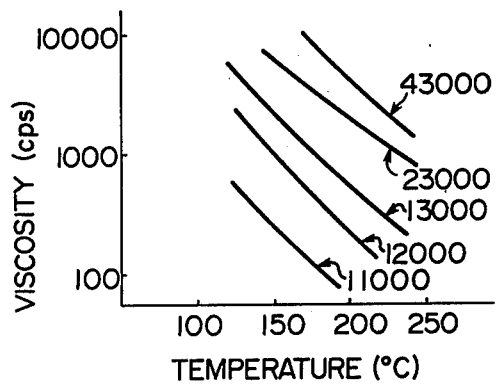
Figure 11:
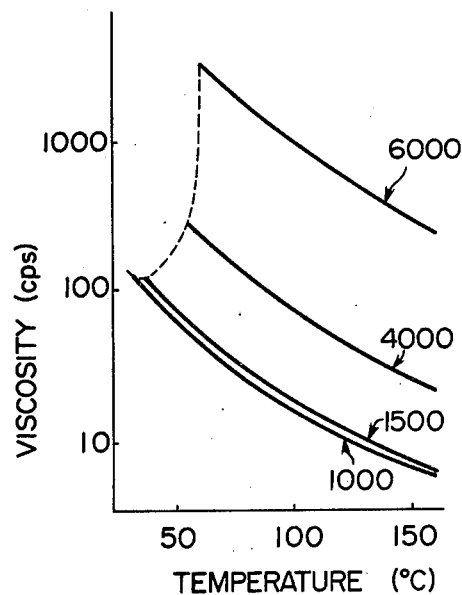
Figure 12:
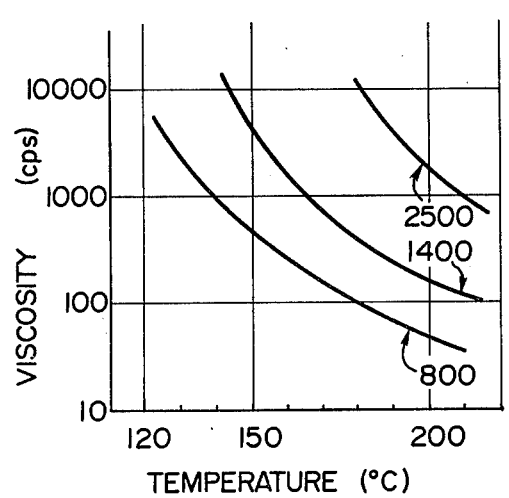

FIGS. 8, 9, 10, 11 and 12 indicate respectively a relationship between the temperature and viscosity in various low-molecular-weight polymers which can be effectively used in the present invention with the viscosities in the range from 0.01 to 100 poise. FIG. 8 indicates the relationship in polyethylene, FIG. 9 in isotactic polypropylene, FIG. 10 in atactic polypropylene, FIG. 11 in polyethylene glycol and FIG. 12 in polystyrene. Symbol "cps" shows a centipoise, and numeral shows average molecular weight which is represented by a number-average molecular weight in FIGS. 8, 11 and 12, and by a weight-average molecular weight in FIGS. 9 and 10. All of the low-molecular weight polymers shown in FIGS. 8 to 12 can be effectively utilized in the process of the present invention.

The viscous liquid in the present invention is preferably of compatibility with any synthetic resin to be injection molded in order to avoid inverse influence of the remaining liquid to the injected synthetic resin when the large portion of the liquid has been released from a mold cavity.

The synthetic resin described in the present invention includes all of thermoplastics which can be generally injection molded. The foaming agent in the present invention includes all of foaming agents which can be used in a foam molding. Such foaming agent includes, for example, physical foaming materials such as nitrogen gas, propane, butane, pentane, Freon, olefins or the like, and chemical foaming agent such as azo-dicarboxylic acid amide, dinitrosopentamethylenetetramine, sodium bicarbonate or the like.

In accordance with the present invention, two or more sorts of synthetic resins can be simultaneously used. For example, FIG. 13 shows a sandwich structure which is injection molded according to the process of the present invention. In FIG. 13, a first synthetic resin 21 containing no foaming agent is injected into a mold cavity 20(13-1), and thereafter a second synthetic resin 22 containing a foaming agent is injected into the same mold cavity (13-2). Finally, a viscous liquid 23 in the present invention is injected into the mold cavity 20 to fill it with the synthetic resins and viscous liquid (13-3). Thereafter, the viscous liquid is released from the mold cavity so that a foamed article will be obtained with surface layer of the first synthetic resin 21 and core of the second foamed synthetic resin 24 (13-4).

When a synthetic resin containing a foaming agent is injected into a mold cavity, the expanded gas dispersed in the mass of the injected synthetic resin escapes to the interior of the mold cavity resulting in undesirable swirl marks on the outer surface of a molded article. In order to avoid this problem, any pressurized gas may be preferably pre-charged in the mold cavity prior to injection of the synthetic resin. This can be explained as the expanded gas in the injected synthetic resin is prevented from escaping from the mass thereof to some degree by the pre-charged gas within the mold cavity. After or during the mold cavity has been filled with the synthetic resin and viscous liquid, the pressurized gas pre-charged in the mold cavity is released therefrom to the atmosphere.

Since the viscous liquid in the present invention is in the form of grease or solid at the ordinary room temperature, an injecting device therefor is preferably an injecting cylinder having a screw.

Figures 1, 14:
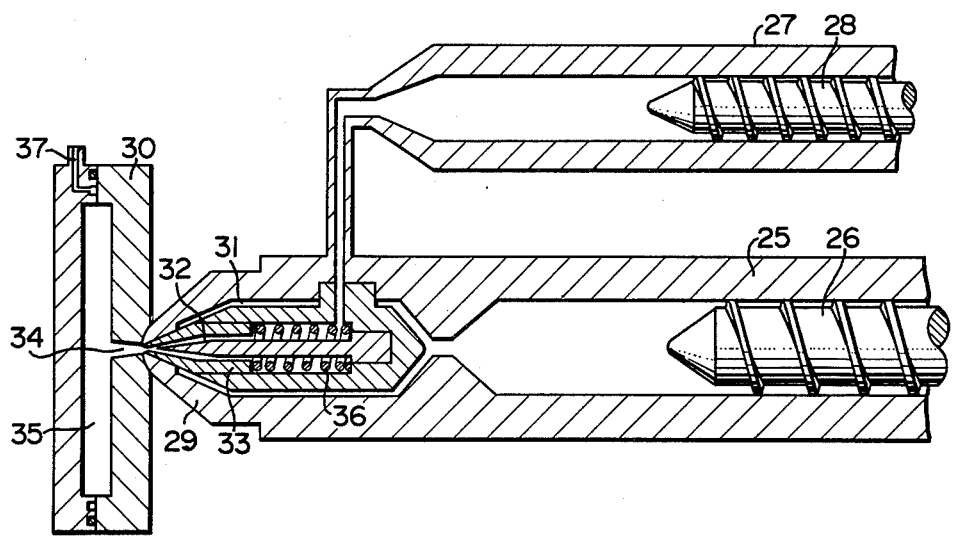
Figures 2, 14:
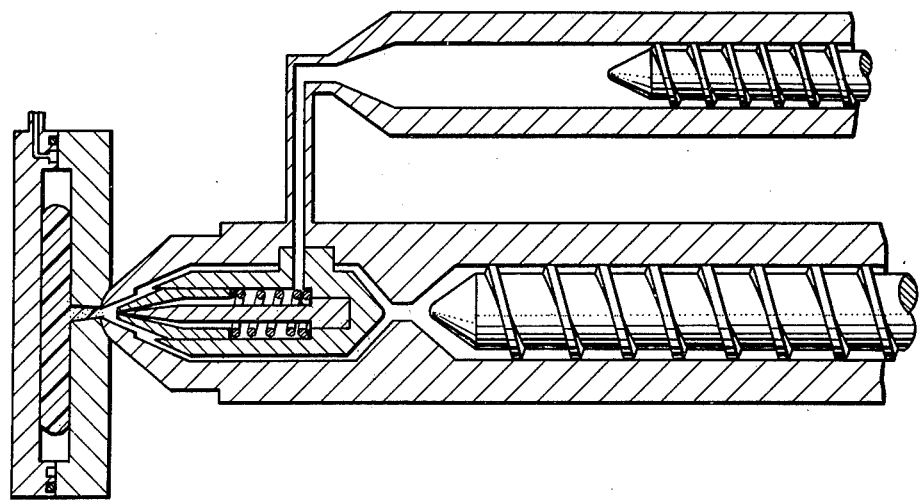

FIG. 14 shows a preferred injection molding machine which can be used according to the present invention.

Referring to FIG. 14, a synthetic resin containing a foaming agent is thermally plastified in an injecting cylinder 25 by means of a screw 26 and accumulated within the injecting cylinder 25. A viscous liquid is heated and accumulated within a second injecting cylinder 27 by means of a screw 28. The first injecting cylinder 25 is provided with a nozzle 29 mounted on the extremity thereof, which is engaged by a mold 30. The interior of the nozzle 29 is divided into an outer passage 31 for injecting the synthetic resin and an inner passage 32 for injecting the viscous liquid. These passages 31 and 32 can be switched to connect with a mold cavity 35 through a sprue 34 by the fore and aft movement of a valve 33. This valve 33 is urged forwardly by the action of a spring 36 so that the inner passage 32 will be held to connect with the mold cavity 35 through the sprue 32 as the screw 26 in the injecting cylinder 25 is not drived forwardly.

First of all, a predetermined volume of the synthetic resin containing the foaming agent is accumulated in the first injecting cylinder 25, and another predetermined volume of the viscous liquid is similarly accumulated in the second injecting cylinder 27 (14-1). Subsequently, a pressurized gas is charged in the mold cavity through a gas passage 37 formed therein to maintain the mold cavity in the pre-pressurized condition. When the screw 26 in the first injecting cylinder 25 is drived forwardly, the pressure of the synthetic resin therewithin is increased to move backwardly the valve 23 so that the outer passage 31 of the nozzle will communicate with the sprue 34 to inject the synthetic resin from the first injecting cylinder 25 into the mold cavity 35 (14-2). Subsequently, the screw 28 is drived forwardly in the second injecting cylinder 27 to increase the pressure of the viscous liquid therewithin so that the valve 23 will be forced to move forwardly to connect the inner passage 32 with the sprue 34. Therefore, the pressurized viscous liquid is injected into the mold cavity 35 toward the mass of the previously injected synthetic resin so that a composite structure will be obtained having its surface layer of the synthetic resin and its core of the viscous liquid (14-3). Subsequently, the screw 28 in the second injecting cylinder 27 is moved backwardly to withdraw a portion of the viscous liquid within the mold cavity 35 to the second injecting cylinder 27 through the sprue 34 and the inner passage 32 resulting in a good foamed product expanded within the mold cavity 35 (14-4).

Various types of injecting cylinders may be used as said second injecting cylinder depending on a viscous liquid utilized in the present invention. When there is used a viscous liquid which is in the form of solid at the ordinary room temperature and has its relatively high viscosity at the raised temperature thereon, any in-line reciprocating screw injection molding machine can be preferably used in the present invention. On the other hand, any preplasticization injection molding machine may be used when the viscous liquid used is in the form of solid at the ordinary room temperature and has its relatively low viscosity at the raised temperature thereof.

In order to prevent any leakage of the viscous liquid from the nozzle of the second injecting cylinder 27 in which the liquid is accumulated, a valve may be preferably mounted between the second injecting cylinder 27 and the nozzle 29 for opening and closing the liquid passage. It is apparent from the above description that the injected viscous liquid within the mold cavity is withdrawn into the second injecting cylinder to expand the injected synthetic resin within the mold cavity. It is therefore preferred that the viscous liquid has its viscosity as low as possible.

In general, a pressure loss as any viscous liquid passes through a cylindrical tube can be represented by the following formula:

$$\Delta P = \alpha \times 1 \cdot \eta \cdot Q / R^4$$

where $\Delta P$ is a pressure loss; 1 is a travelling distance; $\eta$ is a viscosity; $Q$ is a flow rate; $R$ is a radius of the cylindrical tube; and $\alpha$ is a constant. It is found from the formula that the pressure loss is proportional to the viscosity. Although it is preferred to use lower viscosity and larger tube, the radius of the tube is limited by the size of the molding machine. If the viscous liquid has its viscosity of above 1000 poise which is an upper limit of viscosity in the conventional synthetic resins, the withdrawal thereof is substantially impossible. By using the viscosity of below 100 poise, the present invention provides a process for foam molding which can be carried out by the molding machine as shown in FIG. 13.

Some examples which were carried out according to the process of the present invention will no be described below.

EXAMPLE 1

A foamed article having its smooth skin with no swirl mark was injection molded according to the steps shown in FIG. 1. Synthetic resin used was consisted of rubber toughened polystyrene including 3% by weight of n-pentane, 0.1% by weight of azo-dicarboxylic acid amide and 1% by weight of talc. Mold cavity used was in the form of a disk which has diameter of 18 cm and thickness of 1 cm. The disk-like mold cavity, which is provided with a direct gate positioned at the central portion thereof, was pre-pressurized by an air pressure of 9.9 kg/cm² prior to the injection molding. The following fluids were utilized as a fluid for forming a core:

Polystyrene with weight-average molecular weight of 100,000;
Atactic polypropylene A with weight-average molecular weight of 23,000;
Atactic polypropylene B with weight-average molecular weight of 13,000;
Polyethylene glycol A with number-average molecular weight of 6,000;
Polyethylene glycol B with number-average molecular weight of 4,000;
Polyethylene glycol C with number-average molecular weight of 1,000;
Polystyrene A with number-average molecular weight of 2,500;
Polystyrene B with number-average molecular weight of 800;
Glycerin;
Water; and
Nitrogen gas.

The synthetic resin with the foaming agent and the fluid for core were heated up to a temperature of 200° C. After the core fluid in the respective composite semi-product had been withdrawn by using any suitable source of vacuum, maximum expansion ratio in each of the core fluids afore-mentioned were measured. Polyethylene for the core fluid was only partially withdrawn from the mold cavity through the gate thereof so that the expansion ratio could not be measured. The maximum expansion ratios which could be measured in the other core fluids are indicated by the following table.

| Core fluid | Maximum expansion ratio |
|---|---|
| Polyethylene | not measured |
| Atactic polypropylene A | 1.9 |
| Atactic polypropylene B | 1.9 |
| Polyethylene glycol A | 1.9 |
| Polyethylene glycol B | 1.8 |
| Polyethylene glycol C | 1.7 |
| Polystyrene A | 1.9 |
| Polystyrene B | 1.9 |
| Glycerin | 1.45 |
| Water | 1.4 |
| Nitrogen gas | 1.4 |

It is noted that the expansion ratio could be increased according to the present invention.

EXAMPLE 2

Figures 1, 15:
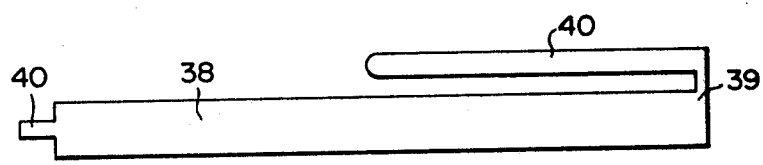
Figures 2, 15:
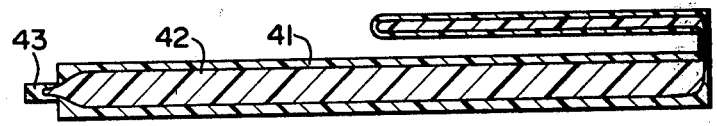
Figures 3, 15:
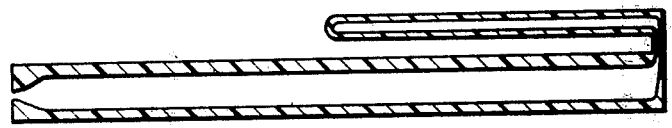

Hollow articles were injection molded according to the steps as shown in FIG. 15. A mold cavity 38 was of a cylindrical post-shape which had diameter of 55 mm and length of 500 mm. The cylindrical post-shaped cavity 38 was provided with a gate 39 formed at the extremity thereof with the other end having a small blind hole 40 formed therein. See FIG. 15-1.

Rubber toughened polystyrene was injected into the mold cavity 38 through a runner 40 via the gate 39 at 200° C. The core fluids listed in Example 1 were injected at 200° C. respectively into each mold cavity into which the above polystyrene had been injected. Thus, the corresponding composite semi-products were formed having their surface layers 41 of the polystyrene and their cores 42 of the respective core fluids. See FIG. 15-2. After the surface layer 41 of polystyrene had set and when the core fluid was still being in hot condition, the composite semi-product was removed from each of the mold cavities. Thereafter, the projection 43 of that semi-product was cut off and a heated gas was blowed into the interior of the semi-product through the gate to force out the core fluid from the semi-product. Thus, a hollow article was obtained. See FIG. 15-3.

The resultant hollow article had different specific gravities with respect to each of the core fluids used, as shown by the following table.

| Core fluid | Specific gravity in each hollow article |
|---|---|
| Atactic polypropylene A | 0.55 |
| Atactic polypropylene B | 0.55 |
| Polyethylene glycol A | 0.55 |
| Polyethylene glycol B | 0.6 |
| Polyethylene glycol C | 0.6 |
| Polystyrene A | 0.55 |
| Polystyrene B | 0.55 |
| Glycerin | 0.65 |
| Water | 0.7 |
| Nitrogen gas | 0.7 |

EXAMPLE 3

Foamed articles were molded in accordance with the process shown in FIG. 13. The mold cavity described in Example 1 was used. Rubber toughened polystyrene was used as a first synthetic resin containing no foaming agent, and the synthetic resin described in Example 1 was used as a second synthetic resin containing a foaming agent.

Prior to the injection molding, the mold cavity was pre-charged with an air pressure of 9.9 kg/cm$^2$ and then the first synthetic resin was injected into the mold cavity at 200° C. Therefore, the second synthetic resin was injected into the mold cavity at 200° C. Each of the core fluids listed in Example 1 was injected at 200° C. into the respective mold cavity into which the first and second synthetic resins had been previously injected. After the respective mold cavity had been filled with said core fluid, it was connected with any suitable source of vacuum to release the core fluid from the mold cavity through the gate. In such a manner, a foamed article having its smooth skin without any swirl mark was obtained with respect to each of the core fluids.

When the polyethylene was used as a core fluid, it was difficult to be withdrawn from the mold cavity. The respective maximum expansion ratios in the other core fluid were substantially the same as in Example 1.

I claim:

1. A process for producing a molding, comprising the steps of injecting plastified synthetic resin material into a closed mold cavity through an inlet in said mold cavity in an amount less than the volume of said mold cavity, injecting at a time not earlier than the time of injecting the synthetic resin a quantity of a heated fluid into the same mold cavity through the same inlet so that said mold cavity is filled, said heated fluid being surrounded by said synthetic resin within said mold cavity to temporarily form a composite structure having a surface layer of said synthetic resin and a core of said fluid, and releasing said fluid from said mold cavity after at least a portion of said synthetic resin has set, characterized by that said fluid is a viscous liquid having viscosity of 0.01-100 poise at the raised working temperature thereof.

2. The process as set forth in claim 1, wherein said synthetic resin contains any suitable foaming agent.

3. The process as set forth in claim 1, wherein said viscous liquid has viscosity of 0.1-100 poise at the raised working temperature thereof.

4. The process as set forth in claim 1, wherein said viscous liquid is an oligomer.

5. The process as set forth in claim 1, wherein said synthetic resin material includes two different synthetic resins, a first of said synthetic resins being initially injected into said mold cavity and said resin containing no foaming agent and a second of said synthetic resins being subsequently injected into said mold cavity and said resin containing a foaming agent.

6. The process as set forth in claim 2, wherein said mold cavity is pre-charged with a gas under pressure prior to the injection of said synthetic resin.

7. The process as set forth in claim 5, wherein said mold cavity is pre-charged with a gas under pressure prior to the injection of said synthetic resins.

8. The process of claim 1 wherein the heated fluid is injected after the synthetic resin.

9. The process of claim 1 wherein the heated fluid is injected simultaneously with the synthetic resin.

10. The process of claim 1 wherein the material having a viscosity of 0.01-100 poise at the raised working temperature is a grease at room temperature.

11. The process of claim 1 wherein the material having a viscosity of 0.01-100 poise at the raised working temperature is a solid at room temperature.

* * * * *